United States Patent [19]

Lionello

[11] 4,207,044
[45] Jun. 10, 1980

[54] APPARATUS FOR AUTOMATICALLY CUTTING AND FEEDING WAFER BISCUITS AND LIKE PRODUCTS TO MOVABLE MOULDS

[75] Inventor: Vincenzo Lionello, Quinto Stampi Rozzano, Italy

[73] Assignee: Carle & Montanari SpA, Milan, Italy

[21] Appl. No.: 898,765

[22] Filed: Apr. 21, 1978

[51] Int. Cl.² .................. B29C 17/10; A23G 3/20
[52] U.S. Cl. ...................... 425/126 R; 99/450.4; 426/127; 425/289; 426/289; 426/518; 426/660
[58] Field of Search .............. 425/126, 127, 110,112, 425/117, 238, 289, 306; 99/450.4, 450.1, 450.2, 450.3, 450.5, 450.6, 450.7; 95/537, 233.1; 426/68, 89, 103, 273, 283, 289, 297, 391, 414, 503, 808, 810, 496, 512, 518, 523, 660

[56] References Cited

U.S. PATENT DOCUMENTS

| | | | |
|---|---|---|---|
| Re. 25,072 | 10/1961 | Monaco | 99/450.4 |
| 546,662 | 9/1895 | Gage | 99/450.4 |
| 696,536 | 4/1902 | Baker et al. | 425/127 X |
| 2,657,646 | 11/1953 | Derbyshire et al. | 425/126 R |
| 2,910,017 | 10/1959 | Oakes | 99/450.4 |
| 3,288,089 | 11/1966 | Schott | 425/126 R |

FOREIGN PATENT DOCUMENTS 2062888  3/1972  Fed. Rep. of Germany .......... 99/450.4

*Primary Examiner*—Philip Anderson
*Attorney, Agent, or Firm*—Kirschstein, Kirschstein, Ottinger & Cobrin

[57] ABSTRACT

An apparatus for automatically cutting and feeding wafer biscuits and like products, which apparatus comprises a stationary chute above and sloping toward a conveyor, a hopper at the upper end of the chute for receiving a stack of wafer slabs and delivering them to the conveyor, a pusher for pushing the lowermost wafer through a lower front side opening of the hopper which faces the chute, stationary cutting blades for cutting the wafer slabs into strips as they are pushed out of the hopper, with wafer strips being intermittently advanced between the cutting blades and the lower end of the chute, the intermittent advance of the strips being in synchronism with the movement of the molds and with the pushing of the strips to the cutting blades.

16 Claims, 9 Drawing Figures

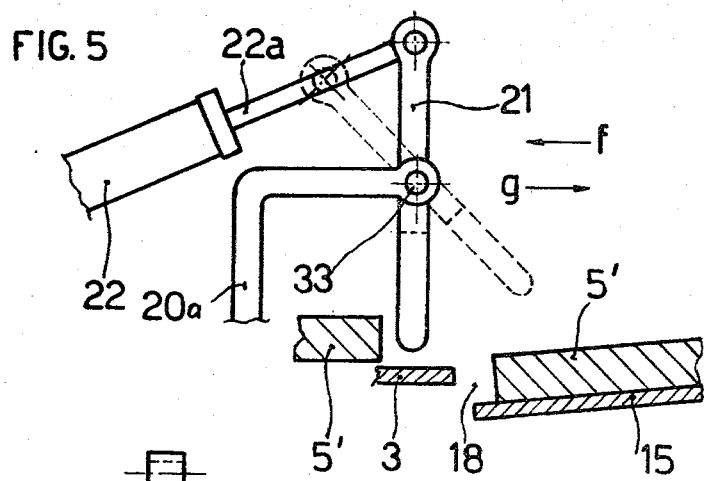
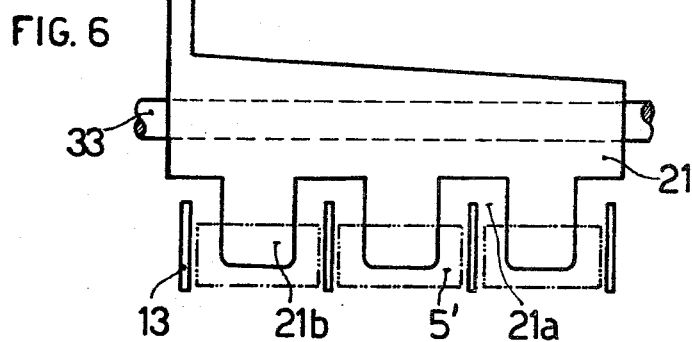
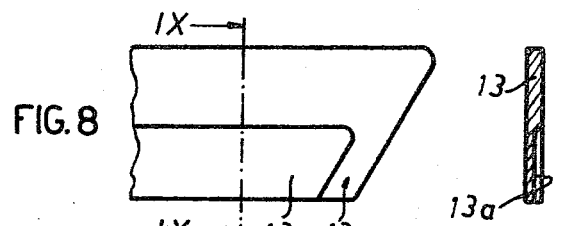
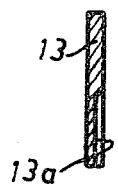
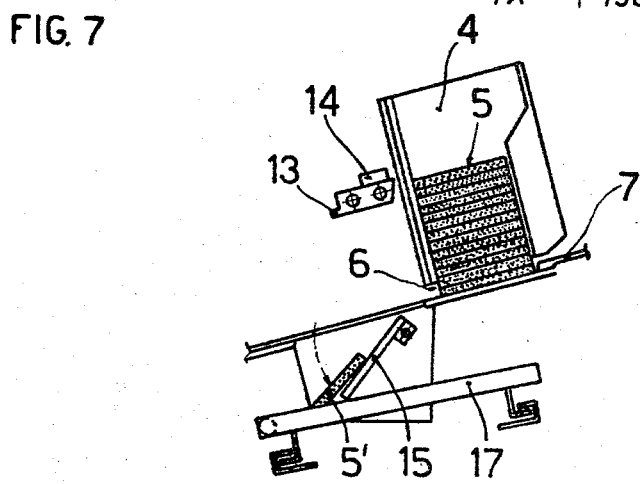

APPARATUS FOR AUTOMATICALLY CUTTING AND FEEDING WAFER BISCUITS AND LIKE PRODUCTS TO MOVABLE MOULDS

This invention relates to an apparatus for automatically cutting and feeding wafer biscuits and like products to moulds movable in one or more rows on a conveyor to a station where solidifiable liquid chocolate is poured into the moulds.

In recent years, wide acceptance has been gained by a pastry product comprising one or more wafer biscuit strips coated with a layer of chocolate.

Such wafer biscuits are known to comprise alternate layers of cream and waffles, and accordingly, are an extremely delicate product both in regard to their handling and the environmental conditions, such as the humidity contents of air. For these reasons, it is common practice to cut the wafer biscuit blanks or slabs into strips just prior to their introduction into the moulds that will bring them to the chocolate coating machine. The feeding of such wafer strips to the moulds is either carried out manually or semiautomatically, with considerably high attendant labour requirements.

It is an object of this invention to provide an apparatus by which wafer biscuit slabs, waffles and similar products, can be automatically cut and fed to movable moulds without recourse to labour, the moulds being advanced continuously on a conventional conveyor and having receptacles arranged in one or more rows.

This object is achieved, according to this invention, by an apparatus characterized in that, on a chute sloping towards the moulds and located above them, there is provided a hopper containing the wafer biscuit slabs to be cut and a pusher means penetrating said hopper, that a cutter means is provided sequentially to said hopper comprising parallel knife blades, and that sequentially to said knife blades a feeding device is provided for the cut wafer biscuits, said device reciprocating in synchronism with said moulds.

With the instant apparatus possessed of such features, it becomes possible to automatically introduce the cut wafer biscuits into the pouring moulds without employing the use of costly labour. Futhermore, by separating the cutter means from the feeding means, these operations can be carried out at optimum rates. For example, the wafer biscuit slabs may be cut at a more or less high rate, depending on their consistency, the cut wafer strips being fed through a specially provided device in synchronism or timed relationship with the increasing, decreasing or constant speed movements of the mould conveyor.

Further features and advantages of the invention will be apparent from the following detailed description, the appended claims, and accompanying drawings.

The invention will be next described with reference to an embodiment thereof, discussed herein by way of example only, and illustrated in the drawings, where:

FIG. 5 is a side view of a detail of the cut wafer biscuit feeding device;

FIG. 6 is a front view of the device of FIG. 5, taken in the direction of the arrowhead f;

FIG. 7 shows a detail of the hopper containing the wafer biscuit slabs to be cut, as well as the knife blade assembly in its raised condition;

FIG. 8 shows the front portion of a knife blade for cutting the wafer biscuit slabs; and FIG. 9 is a sectional view of a knife blade taken along the line IX—IX of FIG. 8.

Figure 1:
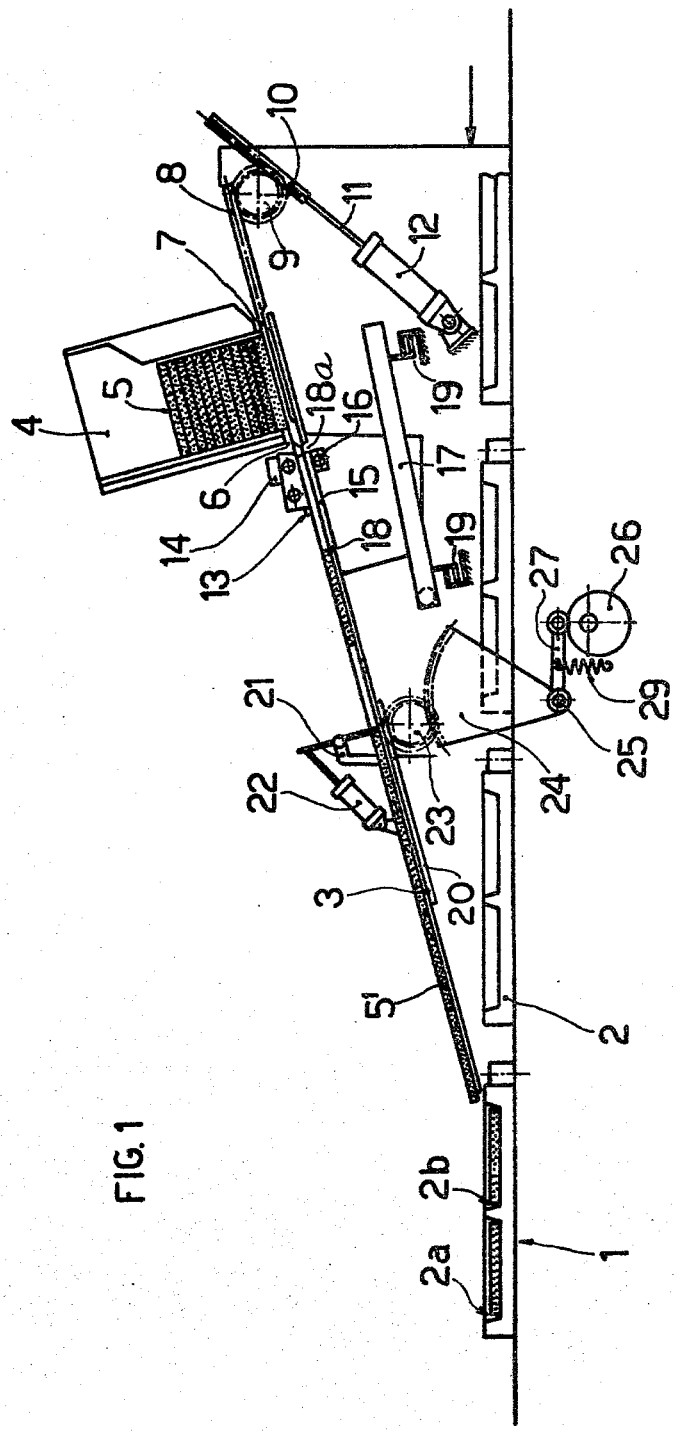
FIGS. 1 to 3 show an apparatus according to this invention, schematically in elevation, and at different operating stages.
Figure 2:
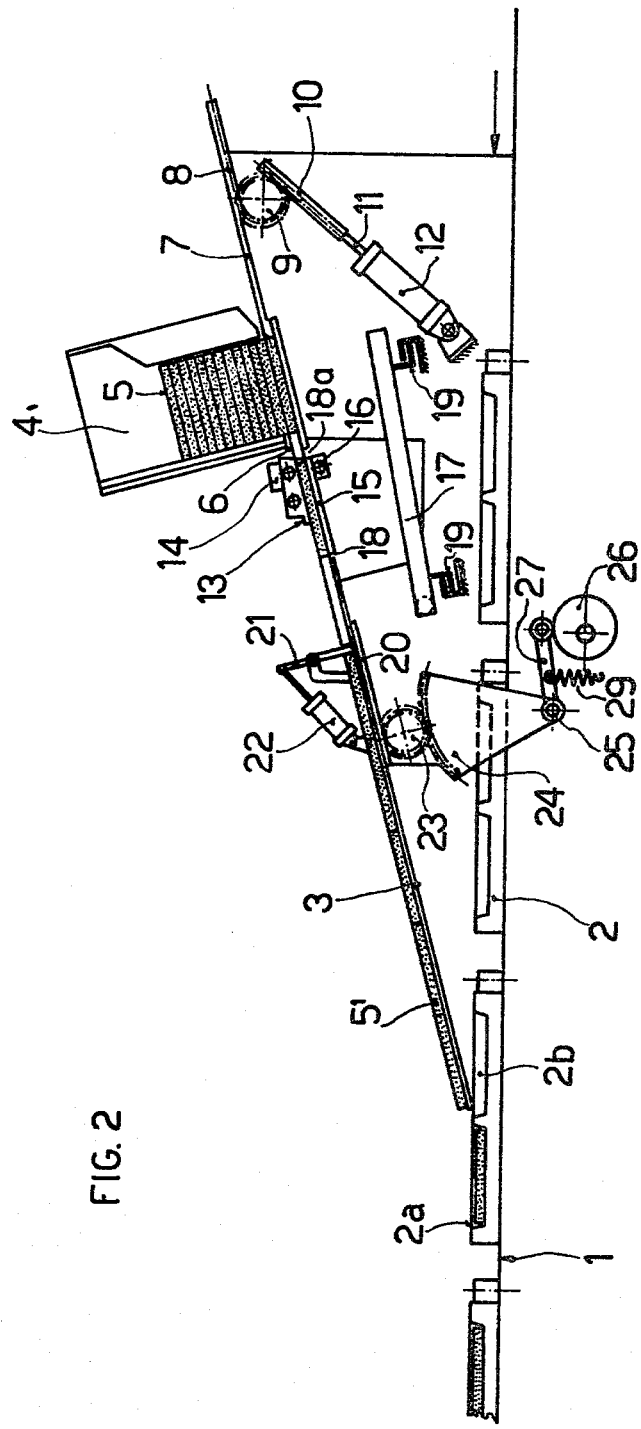
Figure 3:
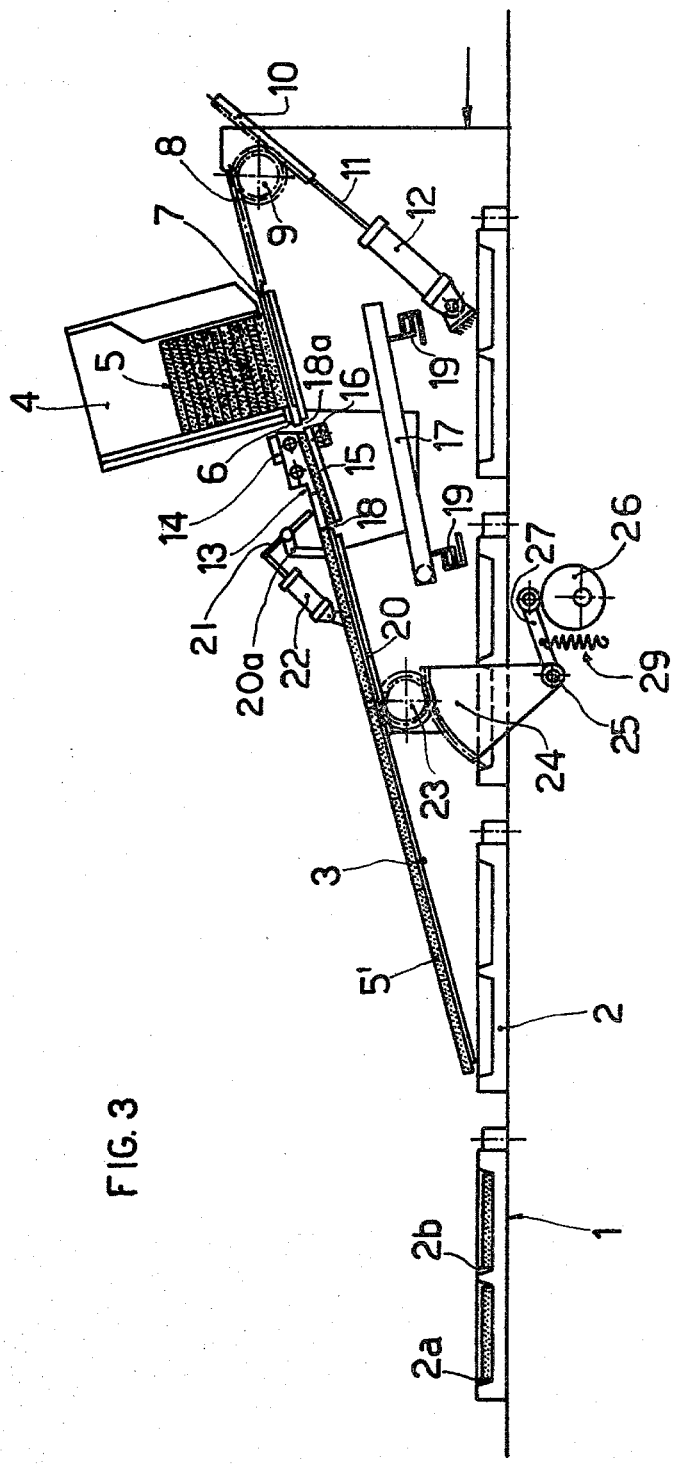

As evidenced in FIGS. 1 to 3, located above a conveyor 1 for the moulds 2, is a chute 3 sloping towards the conveyor 1 and having a lower end proximate to the conveyor 1.

Figure 4:
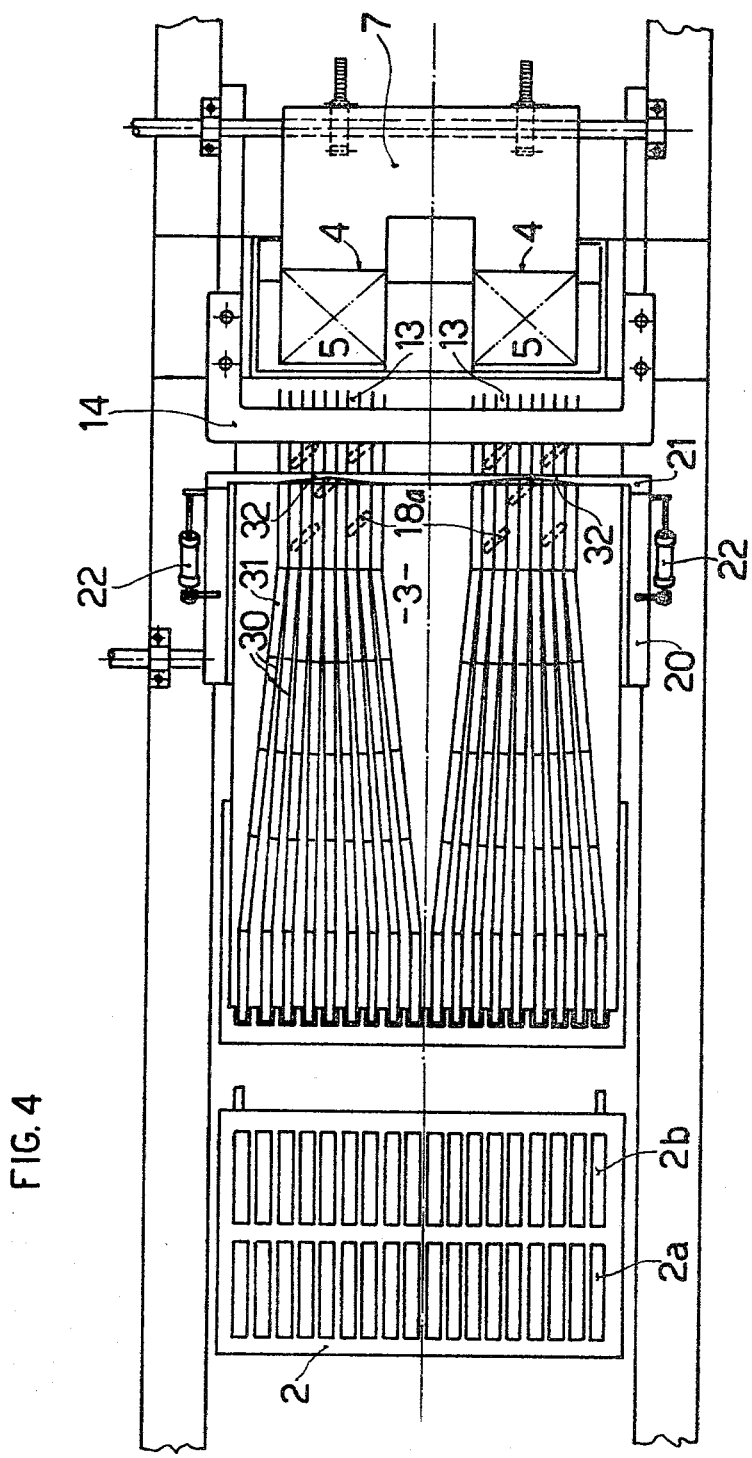
FIG. 4 is a plan view of the apparatus shown in FIGS. 1 to 3.

At the top portion of the chute 3, adjacent the upper end thereof, there is provided a hopper 4 (or two as shown in FIG. 4) including several partitions which are arranged in pairs parallel and opposite to one another and adapted to accommodate a stack of wafer biscuit slabs 5 to be cut. On its front side, the hopper 4 has a lower opening 6, adjusted to fit the thickness and overall size of the wafer biscuit slabs 5. In order to cause a wafer biscuit slab 5 to move out through the front opening 6, there is advantageously provided a pusher means 7 penetrating a lower rear opening of the hopper 4 and including a rack 8 in mesh engagement with gear wheels 9. The gear wheels 9 engage, in turn, an additional rack 10 connected to the piston rod 11 of a cylinder 12 which is operated, for example, by compressed air. The speed of motion of the piston rod of the cylinder 12 may be controlled by means of a specially provided valve means.

By reciprocating the rod 11 through the gear wheels 9, the pusher means 7 is also caused to reciprocate through the rack 8. In front of the opening 6 in the hopper 4, on the chute 3, there are arranged knife or cutting blades 13 accommodated in a support or holder 14 and extending parallel to each other and to the chute 3. Below the set of cutting blades 13, the chute includes an opening 18 in which a door 15 is provided, which can be swung about a horizontal axis 16 between a first position in which the door is aligned with the chute 3 (FIGS. 1 and 2) and a second position in which the door slopes toward the conveyor 1 with a greater inclination than the chute 3 (FIG. 3). To hold the door 15 in the first position shown in FIGS. 1 and 2, it is advantageously urged by a biassing spring (not shown). Below the door 15, a container 17 is provided which is open at the top and receives the crumbs produced during the cutting step and falling down through slots and apertures 18a formed before and after the door 15 as well as in the door itself. The container 17 may be slidable on guides 19 to facilitate the withdrawal of the container 17. The container 17 may also be equipped with a vibrator (not shown) for continuously discharging such crumbles.

Sequentially to the door 15, on the chute 3, there is provided a reciprocable slide 20 carrying a feeding comb 21 extending crosswise with respect to the longitudinal axis of the chute 3. Said comb is pivotally supported by a support 20a rigid with the slide 20 may be and swung by means of a pneumatic cylinder 22 or other similar means. To reciprocate the slide 20, the slide itself includes a rack at its bottom with which meshes a gear wheel 23 driven by a gear segment 24. The segment 24 is capable of oscillating about a spindle 25 mounted rigid with the machine structure. In order to impart the slide 20 a synchronous motion with the advance of the moulds 2, and to enable the now cut wafer strips 5' to be accurately aligned in the receptacles 2a, respectively 2b, of the moulds 2, means is provided comprising a cam 26 which is rotated directly by that same shaft (not shown) which drives the conveyor 1 for the moulds 2. The cam 26 acts on a cantilever arm 27 rigid with the lower portion of the gear segment 24, and advantageously, said arm 27 is biassed by a spring means 29. Understandably, instead of a cam, a grooved disk could be provided, in which would run a link member forming the free end of the arm 27. The cam 26 has an eccentrical profile so designed as to cause the reciprocating movement of the slide 20, and accordingly the advancing motion of the wafer strips 5' into the moulds 2, to occur in synchronism with the motion of the moulds. If, for instance, a mould has to be replaced, it will be sufficient to replace the cam 26 to adjust the movement of the slide 20 for the fresh requirements. As may be observed in FIG. 4, the pusher means 7 advantageously has a U-like shape, the spaced free ends of the "U" penetrating the hoppers 4 that contain the wafer biscuit stacks 5. As the front, the hoppers 4 are surrounded by the supporting means 14, of C-like configuration, which supports the parallel knife blades 13, these blades being mounted to the support 14 with the interposition of spacers effective to determine the width of the wafer strips to be cut. When the width of the wafer biscuit strip to be cut must be changed, it will suffice to replace such spacers intervening between the blades 13 with different width spacers, and readjust the blades 13.

Advantageously, the chute 3 is provided, below the blades 13, with oblique through slots 18a allowing the crumbs to fall into the underlying container 17.

Advantageously, the knife blades 13 are elastic and flexible, and united to the portion opposite the hoppers 4 through sheet metal members 30 forming channels 31 for guiding the cut wafer strips.

After the knife blades, which are arranged parallel to one another, the sheet metal members 30 diverge fan-like such as to present at the lower end of the chute 3, shortly before the delivery area of the cut wafer strips to undermoving moulds 2, the correct spacing as corresponding to the interspaces (in the transverse direction) of the receptacles 2a and 2b of the moulds 2.

For feeding the cut wafer strips, provision is made according to the invention for a slide 20 which is reciprocable in synchronism with the undermoving moulds 2. The slide 20 carries, on its side facing the blades 13, a feeding device comprising a comb 21 which may be swung or oscillated about a transverse axis. The comb 21 motion is produced, for example, by two pneumatic cylinders 22 rigid with the slide 20 and operated in synchronism with the movement of the slide 20. To ensure that the wafers 5 cut into strips reach the receptacles 2a, respectively 2b, of the moulds in perfect alignment, i.e. to compensate for the different lengths of the channels 31 (due to the sheet metal members 30 diverging), the feeding comb 21 has a recessed front portion 32 defined, when viewed from above, by two walls converging toward each other above the channel 31 that is arranged in the center of the fan-like configuration leading to the delivery; area at the end of the chute 3.

FIG. 5 illustrates a detail of the feeding comb 21. This comb 21 is supported for rotation about a transverse shaft 33 carried by the support 20a of the slide 20 structure. The upper or top end of the comb 21 is connected for articulation to the piston rod 22a of the pneumatic cylinders 22. Thus, during the return stroke of the slide 20 in the direction of the arrowhead g, the comb 21 is brought by means of the cylinders 22 to the position shown in dotted lines, thus moving beyond the underlying rows of cut wafer strips 5'. On completion of the return stroke, the comb 21 is positioned as shown in full lines, such as to urge the cut wafer strips 5' in the direction indicated by the arrowhead f. In order to ensure that the desired number of wafer strips is entrained at all times and to prevent the wafer strips from suffering damage owing to imperfect positioning of the wafers 5 onto the door 15, the door is such as to be oscilatable downwards, e.g. against the bias of a spring means, into said second position, thereby the lower edge of the opening 18 acts as a stop for the wafer strips 5'. After the comb 21 has moved beyond the cut wafer strips 5' positioned on the spring loaded door 15 (FIG. 3) and has advanced the strips 5' on the chute 3 (FIG. 2), the door 15 is again raised to bring the wafer strips 5' to the position for next feeding operation.

From FIG. 6, it may be observed that the comb 21 is formed at the bottom with notches 21a which permit the blades 13 to be cleared, whereas the projections or lugs 21b are effective to push the wafer biscuits cut into strips 5' through the parallel-arranged blades 13, and enter the channels 31.

FIG. 7 illustrates a hopper 4 filled with wafer slabs 5 still uncut. To allow for a quick cleaning of the blades 13, or replacement of the blades, the latter can be lifted out together with their frame 14.

Simultaneously with but independently of the above, the door 15 may be wide opened towards the container 17 into a third position (FIG. 7), in which it slopes toward the conveyor 1 with an inclination greater than in said second position (FIG. 3), to permit any wafer biscuits 5 damaged during the cutting operation to be discarded. It is thus ensured that only correctly cut wafer strips reach the receptacles 2a, 2b, of the moulds 2.

As may be seen in FIGS. 8 and 9, the blades 13 are advantageously undercut at their lower or bottom portion 13a to afford a cutting action producing a minimum of crumbs.

The apparatus described hereinabove operates as follows. As represented in FIG. 3, the pusher means 7 and slide 20 are completing their return strokes, while the door 15 and comb 21 are being concurrently lowered.

At this stage, the mould 2 below the lower end of chute 3 starts to move concurrently with the comb 21 travel movement, which occurs at the same speed as that of the mould 2, thereby the first row of strips 5' is deposited into receptacles 2a in the mould 2.

FIG. 2 shows the mould 2 with the comb 21 being advanced to deposit the second row of strips 5' into receptacles. It should be noted that the mould 2 advances continuously, whereas the advance movement of the comb 21 is slowed down by the cam 26, at the central point of the mould 2.

FIG. 1 shows the second row of wafer strips 5' as already deposited, and at this stage the comb 21 begins to be raised and returned for a fresh cycle, as illustrated by FIG. 3. Simultaneously with—but independently from—the movement of the advancing means defined by slide 20 and comb, 21, the pusher means 7 causes two more rows of wafer slabs 5 to be subsequently advanced from the hopper 4 through the front opening 6 in the latter, thus forcing the wafer slabs 5 through the parallel knife blades 13 carried by the holder 14.

To prevent the advancing means, 20,21 from remaining without wafers cut into strips 5', or the pusher means 7 from executing too many strokes and cause too many cut wafers 5' to be advanced, these two means are equipped with interlinked control devices, such as to avoid erroneous and out-of-phase movements which could produce unacceptable breakages of the wafer slabs 5, respectively strips 5'. Such control devices are of well known design and not illustrated here in any detail.

I claim:

1. An apparatus for automatically cutting and feeding wafer biscuits and like products to moulds advanced in at least one row on a conveyor, the apparatus comprising
   (A) a stationary chute arranged above and sloping toward said conveyor,
      (i) said chute having a lower end proximate to said conveyor and
      (ii) an upper end spaced from said conveyor,
   (B) at least one hopper arranged adjacent said upper end of said chute for receiving a stack of wafer slabs,
      (i) said at least one hopper having a lower front opening at one side facing said chute and a lower rear opening at one side opposite said chute,
      (ii) said front opening having a size substantially corresponding to the thickness and length of each of said wafer slabs,
   (C) pusher means reciprocable through said lower rear opening for pushing a lower wafer slab of said stack of wafer slabs through said lower front opening,
   (D) stationary cutting blades in front of said lower front opening and parallel to said chute for cutting said wafer slabs pushed by said pusher means into wafer strips,
   (E) advancing means between said cutting means and said lower end of said chute for advancing said wafter strips along said chute toward said lower end into said moulds, and
   (F) means for reciprocably operating said advancing means in synchronism with said moulds on said conveyor and said pusher means.

2. An apparatus as claimed in claim 1, further comprising an opening in said chute and a door in said opening for slideably supporting said wafer strips, said door pivotable about a horizontal axis between a first position in which said door is aligned with said chute and a second position in which said door slopes toward said conveyor with a greater inclination than said chute, such that said wafer strips stop against said lower end of said opening.

3. An apparatus as claimed in claim 2, wherein said door is pivotable into a third position in which said door slopes toward said conveyor with an inclination greater than in said second position for discharging said wafer strips lying on said door.

4. An apparatus as claimed in claim 2, wherein said pivotable door has a plurality of through slots.

5. An apparatus as claimed in claim 1, wherein said chute has, below said parallel cutting blades, a plurality of through slots for allowing crumbs occurring during cutting of said wafer slabs to fall through.

6. An apparatus as claimed in claim 5, wherein said through slots extend obliquely with respect to said cutting blades.

7. An apparatus as claimed in claim 5, further comprising a container below said through slots for receiving said crumbs passing through said slots.

8. An apparatus as claimed in claim 7, further comprising guides for slidable withdrawal of said container.

9. An apparatus as claimed in claim 1, further comprising sheet metal members downstream of said cutting blades for guiding said wafer strips toward said moulds.

10. An apparatus as claimed in claim 9, wherein said sheet metal members are arranged in a fan-like mutual configuration diverging in the direction of movement of said wafer strips, such as to have a final mutual spacing corresponding to the interspace between individual receptacles within said moulds.

11. An apparatus as claimed in claim 1, wherein said means for advancing said wafer strips comprises a reciprocable slide carrying a feeding comb extending across said chute for engagement with said wafer strips.

12. An apparatus as claimed in claim 1, wherein said means for advancing said wafer strips comprises a reciprocable slide carrying a feeding comb extending across said chute for engagement with said wafer strips, and wherein said means for reciprocably operating said advancing means comprises a rack fixed to said slide, a gear wheel meshing with said rack, an oscillating gear segment meshing with said gear wheel and having a cantilever arm, and a rotatable cam having a substantially eccentric profile for operating said cantilever arm.

13. An apparatus as claimed in claim 11, further comprising a support fixed to said slide and pivotally supporting said feeding comb, and means for pivoting said comb in synchronism with the movement of said slide.

14. An apparatus as claimed in claim 10, further comprising a reciprocable feeding comb for advancing said wafer strips, said feeding comb having a recessed front portion defined by two walls converging toward each other above that of said sheet metal members which is arranged in the center of said fan-like configuration.

15. An apparatus as claimed in claim 1, comprising two spaced hoppers for said wafer slabs and a pusher of U-like configuration having spaced ends for entering said hoppers.

16. An apparatus as claimed in claim 1, wherein said cutting blades are undercut at their bottom portions.

* * * * *